United States Patent [19]

Wazaki et al.

[11] Patent Number: 4,921,064
[45] Date of Patent: May 1, 1990

[54] DRIVING WHEEL SLIP CONTROL SYSTEM FOR VEHICLES

[75] Inventors: Yoshio Wazaki; Tetsuya Oono; Nobuyuki Narisawa, all of Wako, Japan

[73] Assignee: Honda Giken Kogyo Kabushiki Kaisha, Tokyo, Japan

[21] Appl. No.: 198,259

[22] Filed: May 25, 1988

[30] Foreign Application Priority Data

Jun. 11, 1987 [JP] Japan .................. 62-145918
Jun. 11, 1987 [JP] Japan .................. 62-145919

[51] Int. Cl.$^5$ .............................................. B60T 8/32
[52] U.S. Cl. ................................ 180/197; 364/426.01
[58] Field of Search ............. 180/197, 54.1; 364/426

[56] References Cited

U.S. PATENT DOCUMENTS

| | | | |
|---|---|---|---|
| 3,776,355 | 12/1973 | Scherenberg | 180/197 |
| 4,095,147 | 6/1978 | Mountz | 180/197 |
| 4,682,667 | 7/1987 | Hosaka | 180/197 |
| 4,763,262 | 8/1988 | Leiber | 364/426 |

FOREIGN PATENT DOCUMENTS 52-35837 9/1977 Japan .
60-151131 8/1985 Japan .

*Primary Examiner*—Richard A. Bertsch
*Attorney, Agent, or Firm*—Armstrong, Nikaido, Marmelstein, Kubovcik & Murray

[57] ABSTRACT

A system for controlling the slip of driving wheels of a vehicle detects an excessive slip state of at least one of the driving wheels of the vehicle wherein the slip of the at least one driving wheel has a magnitude greater than a predetermined magnitude, and interrupts fuel supply to the engine of the vehicle when the excessive slip state is detected. The system further detects a predetermined smaller slip state wherein the slip has a magnitude less than the predetermined magnitude. An amount of fuel supplied to the engine is corrected in dependence on the value of at least one predetermined operating parameter of the engine, which is sensed by at at least one parameter sensor, when the predetermined smaller slip state is detected. A plurality of different correction values responsive to operating conditions of the engine, which correct the amount of fuel supplied to the engine, are rendered virtually ineffective when the predetermined smaller slip state is detected.

15 Claims, 9 Drawing Sheets

| FIG. 5A | FIG. 5B |

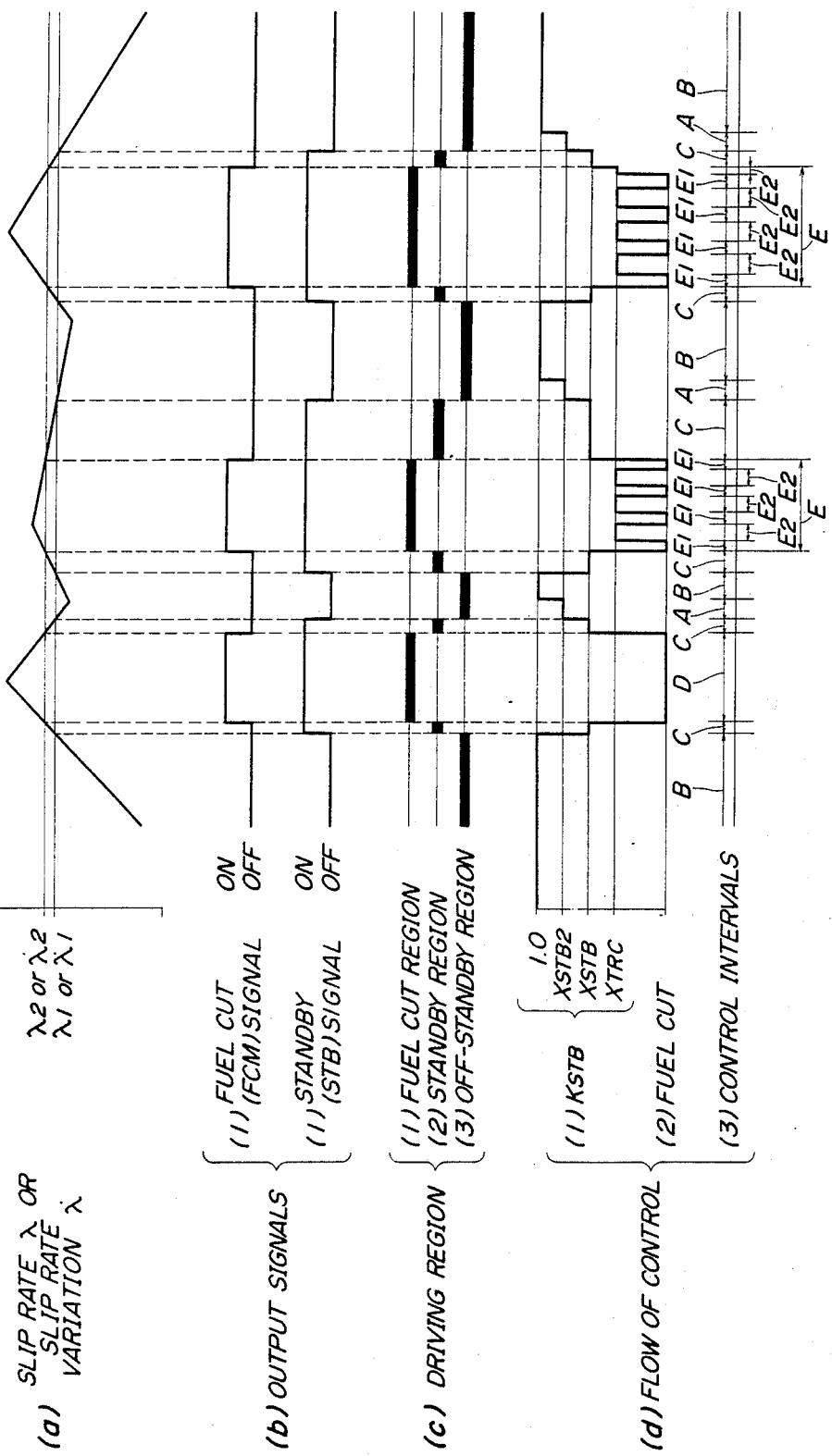

DRIVING WHEEL SLIP CONTROL SYSTEM FOR VEHICLES

BACKGROUND OF THE INVENTION

This invention relates to driving wheel slip control systems, and more particularly to improvements in or to such systems, which enable proper slip control when the driving wheels are in a state wherein the slip has a magnitude smaller than that in an excessive slip state.

As recognized in general, a driving wheel of an automotive vehicle undergoes a slip when the vehicle is started to run or when it is accelerated, if the driving force of the driving wheel surpasses a frictional force developed between the tire of the driving wheel and the road surface [=the coefficient of friction between the tire and the road surface × load of the vehicle weight on the driving wheel (wheel load)]. The frictional force acts in the advancing or longitudinal direction of the vehicle. The magnitude of the slip may be represented by a slip rate λ which is expressed by the following equation:

$$\lambda = (V_W - V)/V_W \qquad 1$$

where $V_W$ represents the circumferential velocity of the driving wheel, and V represents the speed of the vehicle.

The frictional force F between the driving wheel tire and the road surface, which defines the upper limit of the effective driving force of the driving wheel, varies with the slip rate λ, as shown in FIG. 1. It will be noted from the figure that the frictional force F assumes the maximum value when the slip rate λ has a predetermined value $\lambda_0$. While the longitudinal frictional force F varies with slip rate λ as indicated by the solid line in the graph, the transverse frictional force, which acts in the transverse direction of the vehicle, varies with slip rate λ, as indicated by the broken line in the graph, such that it becomes smaller as the slip rate increases.

A slip prevention system has been proposed, e.g. by Japanese Patent Publication (Kokoku) No. 52-35837, which is based upon the above recognition of the relationship between longitudinal frictional force, transverse frictional force and slip rate, and which controls the slip rate such that the longitudinal frictional force may be the maximum so as to obtain the maximum driving efficiency of the vehicle, while the transverse frictional force may have a drop as small as possible so as to prevent a skid or sideslip of the vehicle.

The above proposed control system is constructed such that the slip of the driving wheels is prevented from becoming excessive through control of the torque of the engine by turning on and off an ignition device of the engine of the vehicle or by allowing and inhibiting fuel supply from a fuel supply device to the engine.

Subsequently, a slip control system has also been proposed, e.g. by Japanese Provisional Patent Publication (Kokai) NO. 60-151,131, which also allows and inhibits the fuel supply for slip control, but is adapted such that when there occurs an abnormal rise in the temperature of a catalytic converter arranged in the exhaust system of the engine, the air-fuel ratio of a mixture supplied to the engine is controlled to a leaner value or to a richer value than a normal value required by the slip state, thereby preventing what is called after-fire, i.e. the phenomenon that unburnt fuel burns in the engine exhaust system, or preventing burning of a catalyst device disposed in the exhaust system for purging toxic components in the exhaust gases.

However, the above proposed fuel supply control does not contemplate the influence of engine rotational speed upon required fuel characteristics of the engine. As a result, the proposed control system can still undergo after-fire or degraded driveability of the engine at low engine rotational speeds, while the catalytic converter is still apt to rise in temperature and even burn to be damaged at high engine rotational speeds.

Furthermore, according to the prior art no contemplation has been made of load on the engine in effecting the fuel supply control for slip control. For instance, in the case of controlling the air-fuel ratio to a leaner value in the above-mentioned specific lower slip state, the amount of drop in the torque or driving force of an internal combustion engine to be caused by reducing the fuel amount supplied to the engine varies depending upon the magnitude of load on the engine. Therefore, in effecting slip control independently of load on the engine in the specific lower slip state, if the target air-fuel ratio is set at a value conforming to a high load operating condition of the engine, slip control is effected to an excessive extent when the engine is operating in a low load operating condition, whereas if the target air-fuel ratio is set at a value conforming to a low load operating condition of the engine, slip control is effected to an insufficient extent when the engine is operating in a high load operating condition. This, therefore, makes it impossible to achieve desired values of slip rate over the entire load range, thereby failing to secure good driveability of the vehicle.

SUMMARY OF THE INVENTION

It is, therefore, the object of the invention to provide a driving wheel slip control system for a vehicle, which is capable of preventing after-fire as well as deterioration of the performance of the catalyst device in the engine exhaust system due to its excessive temperature rise, over the entire engine rotational speed range, and also capable of securing good driveability over the entire engine load range, when the driving wheel(s) of the vehicle is in the specific lower slip state immediately preceding or immediately following the excessive slip state.

In order to attain the above object, the present invention provides a system for controlling the slip of driving wheels of a vehicle equipped with an engine, including fuel supply means for supplying fuel to the engine, first slip detecting means for detecting an excessive slip state of at least one of the driving wheels of the vehicle wherein the slip of the at least one driving wheel has a magnitude greater than a predetermined magnitude, and fuel supply interrupting means associated with the fuel supply means and the first slip detecting means, for causing the fuel supply means to interrupt fuel supply to the engine when the excessive slip state is detected by the first slip detecting means.

The system according to the invention is characterized by an improvement comprising:

second slip detecting means for detecting a predetermined smaller slip state wherein the slip has a magnitude less than the predetermined magnitude;

parameter sensing means for sensing at least one predetermined operating parameter of the engine; and fuel amount correcting means associated with the fuel supply means, the second slip detecting means, and the parameter sensing means, for correcting an amount of fuel supplied from the fuel supply means to the engine, in dependence on a value of the at least one predetermined operating parameter of the engine, which is sensed by the parameter sensing means, when the second slip detecting means detects the predetermined smaller slip state.

Preferably, the at least one predetermined operating parameter is the rotational speed of the engine, and the fuel amount correcting means corrects the amount of fuel in a manner such that as the rotational speed of the engine is higher, the air-fuel ratio of a mixture supplied to the engine is smaller.

Alternatively, the at least one predetermined operating parameter may be load on the engine, such as the opening of a throttle valve in the intake passage of the engine and pressure within the intake passage.

Further preferably, the system may further comprise correction value setting means responsive to operating conditions of the engine for setting a plurality of different correction values which correct the amount of fuel supplied to the engine, and correction value nullifying means associated with the second slip detecting means for rendering virtually ineffective the plurality of different correction values set by the correction value setting means when the predetermined smaller slip state is detected by the second slip detecting means.

The above and other objects, features and advantages of the invention will be more apparent from the ensuing detailed description taken in conjunction with the accompanying drawings.

BRIEF DESCRIPTION OF THE DRAWINGS

FIG. 6 is a timing chart showing the relationship between a slip rate or a slip rate variation, output signals from the circuit of FIG. 4, and the slip control;

DETAILED DESCRIPTION

The invention will now be described in detail with reference to the drawings showing an embodiment thereof.

Figure 1:
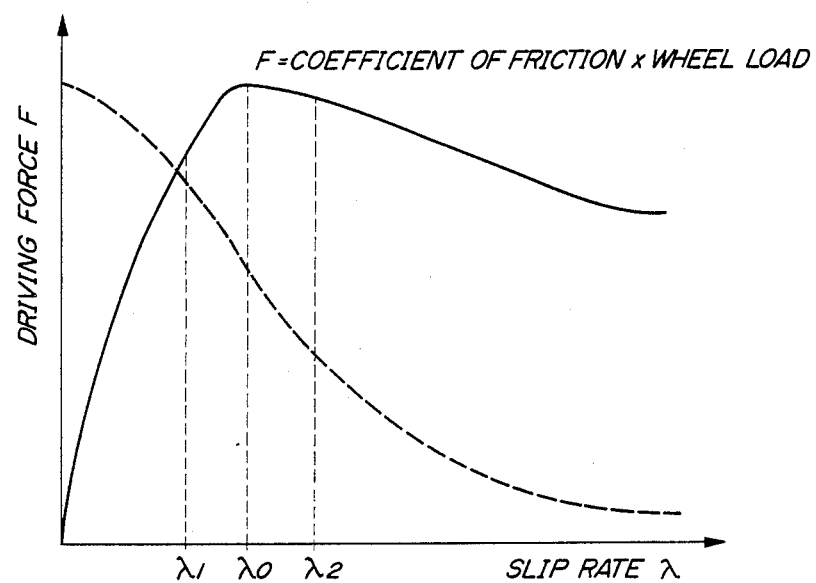
FIG. 1 is a graph showing the relationship between the slip rate of a driving wheel tire of a vehicle and a frictional force between the tire and the road surface.
Figure 2:
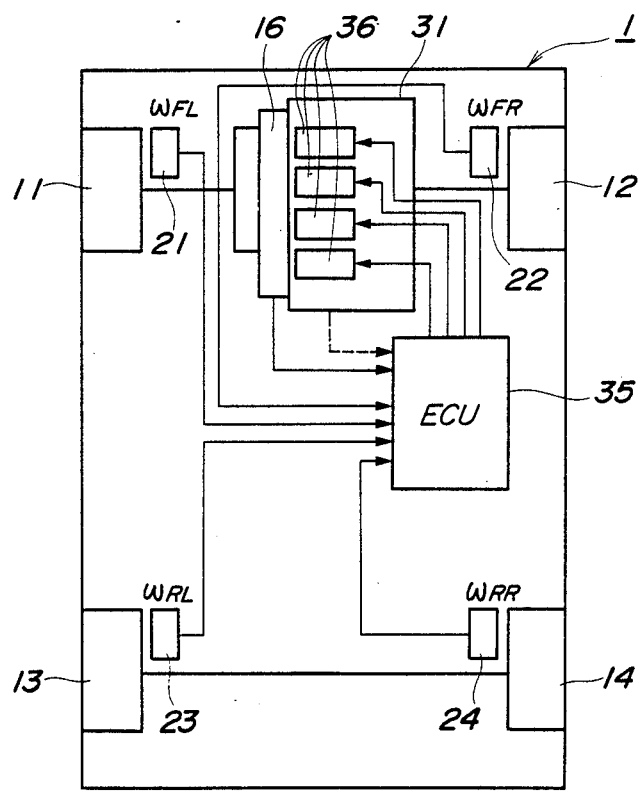
FIG. 2 is a schematic diagram showing the construction of a vehicle equipped with a driving wheel slip control system according to the invention.

Referring first to FIG. 2, there is shown a vehicle 1 equipped with a driving wheel slip control device according to the invention. The vehicle 1 is a front wheel drive type with front wheels 11 and 12 as driving wheels which are driven by an internal combustion engine 31, and rear wheels 13 and 14 as driven or trailing wheels. Further, the invention could be similarly applied to a rear wheel drive type vehicle. Therefore, for the purposes of this application, trailing wheels are considered to be non-driving wheels. In other words, in a front wheel drive car, the trailing wheels would be the rear wheels, while in a rear wheel drive car, the trailing wheels (non-driving wheels) would be the front wheels. The driving wheels 11, 12 and the trailing wheels 13, 14 are provided, respectively, with driving wheel speed sensors 21, 22, and trailing wheel speed sensors 23, 24, the driving wheel speed sensors 21, 22 sensing the rotational speeds $\omega FL$ and $\omega FR$ of the respective left and right driving wheels, and the trailing wheel speed sensors 23, 24 sensing the rotational speeds $\omega RL$ and $\omega RR$ of the respective left and right driven wheels. Output signals from these sensors are delivered to an electronic control unit (hereinafter referred to as "ECU") 35. In the present embodiment, ECU 35 forms first slip detecting means, second slip detecting means, fuel supply interrupting means, fuel amount correcting means, correction value setting means, and correction value nullifying means.

In ECU 35, the larger value of the driving wheel speeds $\omega FL$ and $\omega FR$ is selected as the driving wheel speed $V_W$ in equation I above and the speed $\omega RL$ or $\omega RR$ of the trailing wheel on the same side as the driving wheel whose speed is selected as $V_W$ is calculated and used as the vehicular speed V in equation I above. The slip rate λ is thus calculated in the following equation:

$$\lambda = \frac{(\omega FL \text{ or } \omega FR) - (\omega RL \text{ or } \omega RR)}{\omega FL \text{ or } \omega FR} \quad \text{(II)}$$

Furthermore, the variation or differential value λ̇ of the slip rate λ is also determined by ECU 35. In digital control, the variation λ̇ may be calculated from difference in slip rate λ between adjacent processing cycles.

In addition, a transmission 16 is interposed between the engine 31 and the driving wheels 11 and 12. The transmission 16 is equipped with a sensor, not shown, which transmits a transmission signal indicative of a gear ratio selected by the transmission 16 to ECU 35. In ECU 35, the torque of driving wheels 11 and 12 is controlled by controlling the output from the engine 31 by means of a fuel supply control system, described hereinbelow, thereby controlling the slip rate λ of the driving wheels 11 and 12.

Figure 3:
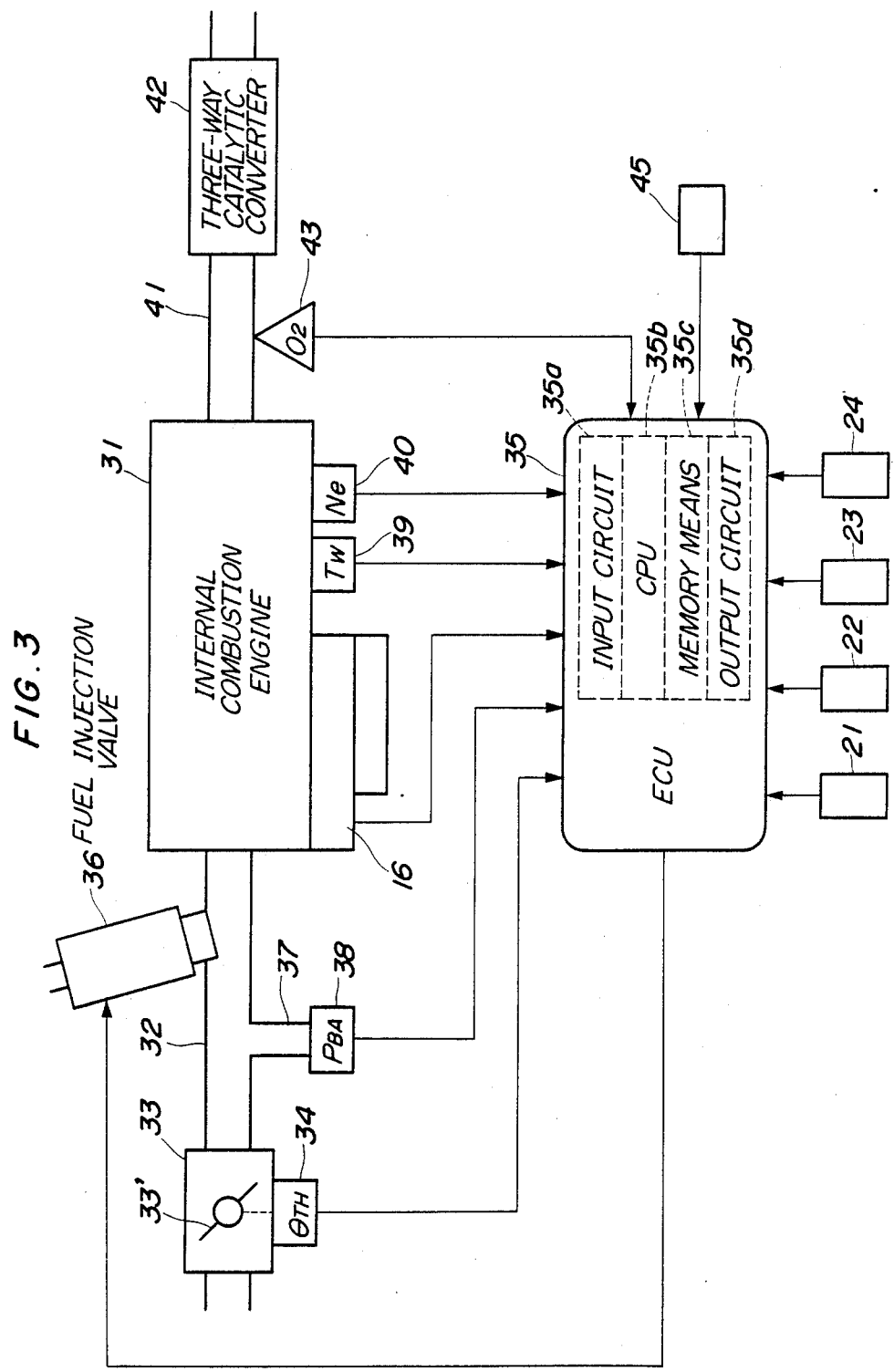
FIG. 3 is a schematic diagram showing a fuel supply control system for controlling the torque of the driving wheels.

In FIG. 3, the fuel supply control system is shown, which controls the fuel supply to the engine 31, which may be a six cylinder type, for instance. Of course, the system would be operable on any type of engine. An intake manifold 32 is connected to the engine 31 to provide an intake passage thereto. A throttle valve 33' is disposed inside of a throttle body 33 which is positioned in intake manifold 32. Connected to the throttle valve 33' is a throttle valve opening (θth) sensor 34 which converts the opening of the throttle valve 33' into an electrical signal and transmits the signal to ECU 35.

A fuel injection valve (fuel supply means) 36 is positioned between the engine 31 and the throttle body 33. A fuel injection valve 36 is positioned slightly upstream of the intake valve (or valves) of each cylinder. The fuel injection valve 36 is connected to a fuel pump and a fuel source, neither of which is shown, in a conventional manner. Fuel injection valve 36 is electrically connected to ECU 35 as well, and the valve opening time period of the valve is controlled by a signal from ECU 35.

An absolute pressure ($P_{BA}$) sensor 38 is disposed at the end of a pipe 37 which communicates with the intake manifold 32 at a point downstream of throttle valve 33' and upstream of fuel injector 36. An absolute pressure signal, converted into an electrical signal by the absolute pressure sensor 38, is transmitted to ECU 35.

An engine coolant temperature sensor (hereinafter referred to as "TW sensor") 39 is disposed on the cylinder block of the engine 31 to monitor the temperature of the engine coolant or engine cooling water. The TW sensor 39 is formed of a thermistor (or a like device) mounted in the peripheral wall of the engine cylinder which is filled with coolant and applies the detected coolant temperature signal to ECU 35. An engine speed sensor (hereinafter referred to as "Ne sensor") 40 is connected to a crankshaft or a camshaft, neither of which is shown, of the engine. The Ne sensor 40 outputs a crank angle position signal (hereinafter referred to as "TDC" (top dead center) signal) at a predetermined crank angle position for every 120° rotation of the crankshaft of the engine in this example with a six cylinder type, the predetermined crank angle position being at a predetermined angle before top dead center (TDC) at the beginning of the intake stroke for each cylinder, and this TDC signal is transmitted to ECU 35.

A three-way catalytic converter 42 is disposed in an exhaust pipe 41 and performs the purging of HC, CO and NOx components in the exhaust gases. On the upstream side of the catalytic converter 42, an $O_2$ sensor 43 is disposed in exhaust pipe 41. Sensor 43 detects the concentration of oxygen in the exhaust gases and transmits an $O_2$ concentration signal to ECU 35.

Furthermore, the driving wheel speed sensors 21 and 22, and trailing wheel speed sensors 23 and 24 are connected to ECU 35. Other sensors 44 are provided to detect other engine parameters and connected to ECU 35, the sensors 44 including the aforementioned sensor for detecting the selected gear ratio of transmission 16.

ECU 35 includes an input circuit 35a for shaping the waveforms of input signals from various sensors (including driving wheel speed sensors 21 and 22, trailing wheel sensors 23 and 24, the gear ratio sensor of the transmission 16) to shift the voltage levels of sensor output signals to a predetermined level, to convert analog signals from sensors to digital signals and so forth. ECU 35 also includes a central processing unit (hereinafter referred to as "CPU") 35b, memory means 35c storing various operational programs which are executed in CPU 35b and operational results therefrom, etc., and an output circuit 35d which outputs a driving signal to fuel injection valve 36, and so forth.

For example, whenever the TDC signal is inputted to ECU 35, the CPU 35b calculates the fuel injection time period $T_{OUT}$ for fuel injection valve 36 from the following equation based on engine parameter signals from the above various sensors which are fed through the input circuit 35a:

$$T_{OUT} = Ti \times (K_{TW} \times K_{PA} \times K_{STB} \times K_{WOT} \times K_{LS} \times K_{AST} \times K_{PB} \times K_{O2}) + (T_{ACC} + T_{IDL}) \quad (III)$$

wherein Ti is a basic value of the fuel injection time period for fuel injection valves 36, and is determined as a function of engine rotational speed Ne and absolute pressure $P_{BA}$ in the intake pipe 32. $K_{TW}$ is an engine coolant temperature-dependent fuel increasing coefficient which is determined as a function of engine coolant temperature TW and applied at warming-up of the engine 31 for accelerating the warming-up as well as early securing an appropriate air-fuel ratio after the start of the engine. $K_{PA}$ is an atmospheric pressure-dependent correction coefficient. $K_{STB}$ is a correction coefficient provided by the invention, applied for slip control and is determined in accordance with slip rate λ and differential value or rate λ̇ of slip rate λ, as hereinafter described. $K_{WOT}$ is a mixture-enriching coefficient applied at wide-open-throttle or full opening of the throttle valve, $K_{LS}$ is a mixture-leaning coefficient applied at full closing of the throttle valve, and $K_{AST}$ is a fuel increasing coefficient applied immediately after the start of the engine. $K_{PB}$ is a predicted load-dependent correction coefficient which is determined in accordance with a rate of change of the intake pipe absolute pressure $P_{BA}$, and $K_{O2}$ is an $O_2$-feedback correction coefficient which is determined in response to the output of the $O_2$ sensor.

$T_{ACC}$ and $T_{IDL}$ are correction variables, the former being an acceleration fuel increasing coefficient applied at acceleration of the engine, and the latter being an idle correction coefficient applied at idle of the engine.

Then, CPU 35b feeds through output circuit 35d a driving signal to fuel injection valve 36 to open valve 36 for a time period $T_{OUT}$ as set forth above. For example, in order to cut fuel to a cylinder, the driving signal from CPU 35b would simply be inhibited.

Figure 4:
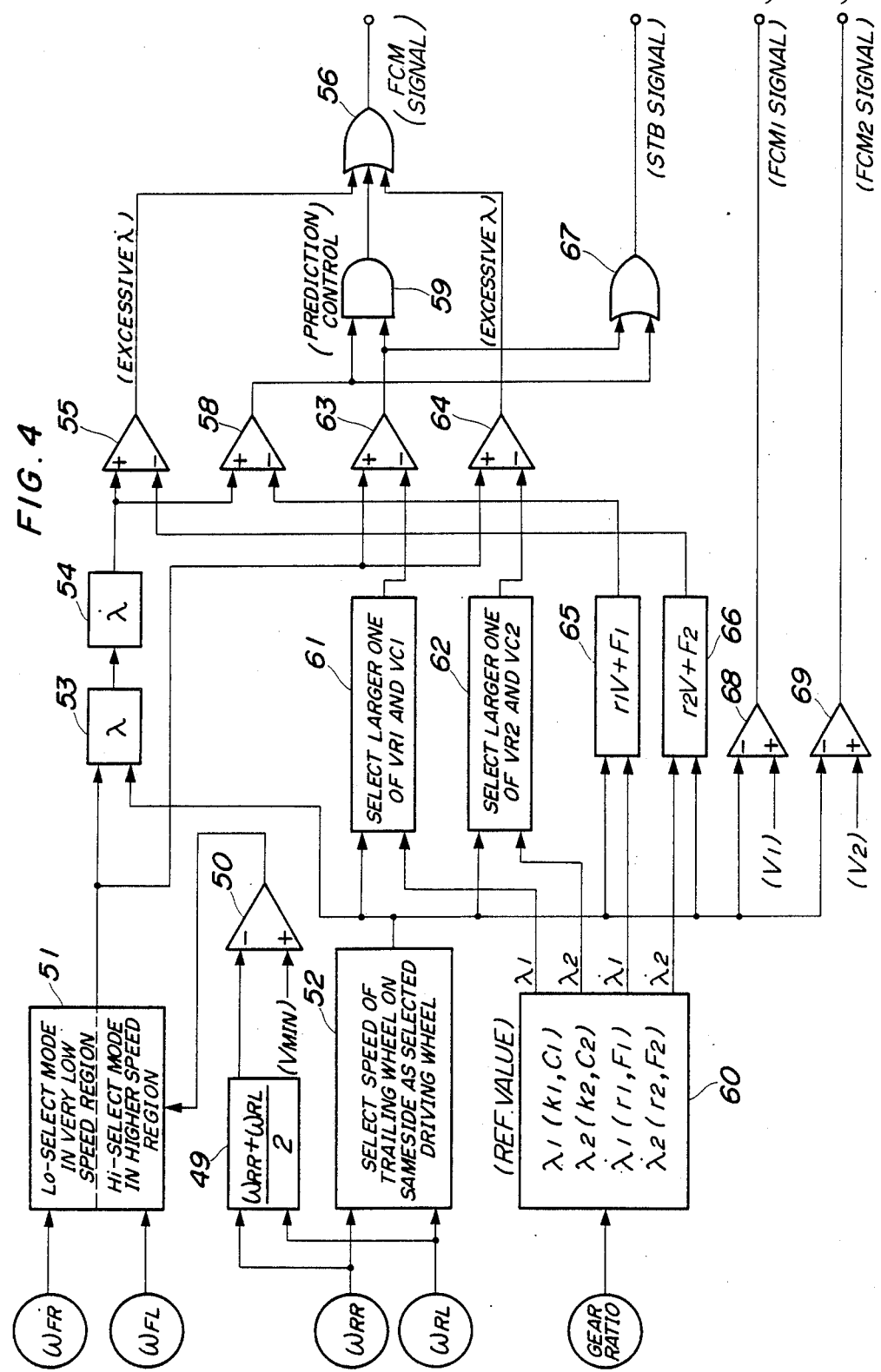
FIG. 4 is a schematic circuit diagram showing an essential part of an electronic control unit (ECU) 35 in FIG. 1.

FIG. 4 shows the configuration of the principal part of CPU 35b of FIG. 3. In FIG. 3, an average vehicular speed arithmetic circuit 49 receives driving wheel speed signal inputs from driving wheel speed sensors 21 and 22 which represent ωRL and ωRR, respectively. The circuit 49 calculates from the signal inputs the average value (ωRL+ωRR)/2. An average vehicular speed checking circuit 50 receives the average value (ωRL+ωRR)/2 and compares same with a predetermined value $V_{MIN}$ (e.g. 5 km/h) to determine whether the vehicular speed is in a very low region. The circuit 50 outputs a high level signal (hereinafter referred to as "H signal") when the former is lower than the latter, and a low level signal (hereinafter referred to as "L signal") when the former is higher than the latter, and applies the output signals to a driving wheel speed selecting circuit 51. The circuit 51 selects the smaller value of the two detected driving wheel speeds ωFL and ωFR when the H signal is supplied from the average vehicular speed checking circuit 50, i.e. when the vehicular speed is in the very low region (Lo-Select Mode), and the larger value of the two detected driving wheel speeds ωFL and ωFR when the L signal is supplied from the circuit 50, i.e. when the vehicular speed is not in the very low region (Hi-Select Mode). The selected detected driving wheel speed ωRL or ωRR is inputted to a slip rate calculating circuit 53 wherein it is applied to Equation I set forth above as the driving wheel speed $V_W$. A trailing speed selecting circuit 52 selects one of the two detected speeds ωRL and ωRR of the left and right trailing wheels which is on the same side as one of the driving wheels whose detected speed value has been selected by the driving wheel speed selecting circuit 51. The selected detected trailing wheel speed ωRL or ωRR is inputted to the slip rate calculating circuit 53 wherein it is applied to Equation I set forth above as the vehicular speed V.

The slip rate calculating circuit 53 operates on the outputs from the selecting circuits 51 and 52 to calculate a slip rate $\lambda$ based upon Equation II. An output indicative of the calculated slip rate $\lambda$ is applied to a differentiating circuit 54 which in turn calculates from the input slip rate $\lambda$ a differential value $\dot\lambda$.

A predetermined value setting circuit 60 is supplied with the signal indicative of the gear ratio from the gear ratio sensor of transmission 16 to set, based upon the input gear ratio, a correction coefficient $k_1$ and a correction variable $C_1$ which are applied to determine a first threshold value $\lambda_1$ of slip rate $\lambda$, a correction coefficient $k_2$ and a correction variable $C_2$ which are applied to determine a second threshold value $\lambda_2$ of slip rate $\lambda$, a correction coefficient $r_1$ and a correction variable $F_1$ which are applied to determine a first reference value $\dot\lambda_1$ of slip rate variation $\dot\lambda$, and a correction coefficient $r_2$ and a correction variable $F_2$ which are applied to determine a second reference value $\dot\lambda_2$ of slip rate variation $\dot\lambda$. The correction coefficients $r_1$ and $r_2$ and the correction variables $F_1$ and $F_2$ are further corrected in dependence on control lag from the time ECU 35 commands the fuel supply control system to operate to the time the latter actually starts to operate.

A first reference speed calculating circuit 61 is supplied with the output indicative of vehicular speed V from the trailing wheel selecting circuit 52 as well as the output indicative of correction coefficient $k_1$ and correction variable $C_1$ from the predetermined value setting circuit 60 and calculates from the input signals a first reference value $V_{R1}$ based upon the following equation:

$$V_{R1} = k_1 V + C_1 \quad (IV)$$

From the first reference speed value $V_{R1}$ calculated as above can be determined the first threshold value $\lambda_1$ of slip rate based upon an equation $\lambda_1 = (V_{R1} - V)/V_{R1}$. Further, the first reference speed calculating circuit 61 compares the calculated first reference speed value $V_{R1}$ with a first lower limit $V_{C1}$, and selects the larger value of the two values $V_{R1}$ and $V_{C1}$. The larger value is outputted from the circuit 61 as the first reference speed value corresponding to the first threshold value $\lambda_1$.

A second reference speed calculating circuit 62 operates, similarly to the first reference speed calculating circuit 61, on the output indicative of vehicular speed V from the trailing speed selecting circuit 52 and the output representing correction coefficient $k_2$ and correction variable $C_2$ from the predetermined value setting circuit 60 to calculate a second reference speed value $V_{R2}$ based upon the following equation:

$$V_{R2} = k_2 V + C_2 \quad (V)$$

Similarly, the circuit 62 outputs the larger value of the second reference speed value $V_{R2}$ and a second lower limit $V_{C2}$ as the second reference speed value corresponding to the second threshold value $\lambda_2$ of slip rate.

A first correction circuit 65 is supplied with the output indicative of selected trailing wheel speed from the trailing wheel speed selecting circuit 52 and the output indicative of correction coefficient $r_1$ and correction variable $F_1$ corresponding to the selected gear ratio from the predetermined value setting circuit 60. The circuit 65 calculates a first reference value $\dot\lambda_1$ of slip rate variation based upon the following equation:

$$\dot\lambda_1 = r_1 V + F_1 \quad (VI)$$

Similarly, a second correction circuit 66 is responsive to the vehicular speed signal from the trailing wheel speed selecting circuit 52 and the output indicative of correction coefficient $r_2$ and correction variable $F_2$ corresponding to selected gear ratio from the predetermined value setting circuit 60, and calculates a second reference value $\dot\lambda_2$ of slip rate variation based upon the following equation:

$$\dot\lambda_2 = r_2 V + F_2 \quad (VII)$$

The correction coefficients $k_1$, $k_2$, $r_1$ and $r_2$ and correction variables $C_1$, $C_2$, $F_1$ and $F_2$ are so set that the first and second threshold values $\lambda_1$ and $\lambda_2$ and first and second slip rate variation reference values $\dot\lambda_1$ and $\dot\lambda_2$, which are determined from the coefficients and variables as above, satisfy the relationship $\lambda_1 < \lambda_2$, and $\dot\lambda_1 < \dot\lambda_2$ irrespective of the value of the selected gear ratio of transmission 16.

An excessive $\dot\lambda$ decision circuit 55 is supplied with the output indicative of differential slip rate $\dot\lambda$ from the differentiating circuit 54 and the output indicative of second reference slip rate variation value $\dot\lambda_2$ from the second correction circuit 66 and compares between them. When the differential value $\dot\lambda$ is greater than the second reference value $\dot\lambda_2$, it applies H signal to an OR gate 56, and otherwise it applies L signal to OR gate 56.

A first prediction control decision circuit 58 is supplied with the $\dot\lambda$ output from the differentiating circuit 54 and the $\dot\lambda_1$ output from the first correction circuit 66 and compares between them to apply H signal to an AND gate 59 when the differential value $\dot\lambda$ is greater than the first reference value $\dot\lambda_1$, and otherwise it generates L signal. A second prediction control decision circuit 63 is supplied with the output indicative of selected driving wheel speed $V_W$ from the driving wheel speed selecting circuit 51 and the output indicative of first reference speed value $V_{R1}$ corresponding to first threshold value $\lambda_1$ from the first reference speed calculating circuit 61 to compare therebetween so that when the driving wheel speed $V_W$ is higher than the first reference speed value $V_{R1}$, it applies H signal to AND gate 59, and otherwise it applies L signal thereto. When supplied with two H signals from the first and second prediction control decision circuits 58 and 63, the AND gate 59 generates H signal which is outputted through OR gate 56.

An excessive $\lambda$ decision circuit 64 is supplied with the $V_W$ output from the driving wheel speed selecting circuit 51 and the output indicative of second reference speed value $V_{R2}$ corresponding to second threshold value $\lambda_2$ from the first reference speed calculating circuit 62 to compare therebetween so that when the driving wheel speed $V_W$ is higher than the second reference speed value $V_{R2}$, it applies H signal to OR gate 56, and otherwise it applies L signal thereto.

As described above, H signal is outputted through the OR gate 56 if any of the following conditions holds: (i)

$\dot\lambda > \dot\lambda_2$, (ii) $\lambda > \lambda_1$ and $\dot\lambda > \dot\lambda_1$, and (iii) $\lambda > \lambda_2$. The H signal through OR gate 56 acts as a trigger signal for causing execution of a control program shown in FIGS. 5A and 5B, hereinafter described in detail, to effect control of the fuel supply control system for prevention of excessive differential slip rate (excessive slip rate variaton) if the condition (i) holds, prediction control if the condition (ii) holds, and prevention of excessive slip rate if the condition (iii) holds, respectively. According to the invention, the fuel supply is cut (hereinafter referred to as "fuel cut") in response to the H signal through OR gate 56 in a manner hereinafter described in detail so as to reduce the torque of the driving wheels 11 and 12 and hence reduce the slip rate $\lambda$ or the slip rate variation $\dot\lambda$ to thereby bring the slip rate $\lambda$ to a desired value. The H signal through OR gate 56 will be hereinafter referred to as fuel cut signal (FCM signal) as appearing at (b) (1) of FIG. 6, and a driving region of the vehicle 1 in which the fuel cut signal is generated will be hereinafter referred to as fuel cut region, as shown at (c) (1) of FIG. 6.

The outputs from the first and second prediction control decision circuits 58 and 63 in FIG. 4 are also applied to an OR gate 67 which generates H signal when at least either one of the outputs from the circuits 58 and 63 is H signal, that is, if either the condition $\dot\lambda > \dot\lambda_1$ or the condition $\lambda > \lambda_1$ holds. The H signal from the OR gate 67 will be hereinafter referred to as standby signal (STB signal) as shown at (b) (2) of FIG. 6, a driving region of the vehicle 1 in which the standby signal is generated and the fuel cut signal is not generated will be referred to as standby region as at (c) (2) of FIG. 6, and any fuel-supplied driving region of the vehicles other than the standby region and the fuel cut region will be referred to as off-standby region as at (c) (3) of FIG. 6.

The standby region corresponds to a driving region which the vehicle passes immediately before shifting to the fuel cut region from the off-standby region or immediately after leaving the fuel cut region [(a), (c) of FIG. 6], as will be understood from the condition $\dot\lambda > \dot\lambda_1$ or $\lambda > \lambda_1$ corresponding to the standby region, and the condition $\dot\lambda > \dot\lambda_1$ and $\lambda > \lambda_1$ corresponding to the fuel cut region, etc. According to the invention, this standby region is provided wherein the fuel quantity supplied to the engine 31 is controlled in an appropriate manner as hereinafter described in detail so as to control the air-fuel ratio of a mixture supplied to the engine to an appropriate value and hence control the output or driving force of the engine during transition from the ordinary fuel-supplied region to the fuel cut region or vice versa, because otherwise during transition between the fuel cut region and the ordinary fuel-supplied region there can take place an excessive rise in the temperature of the three-way catalytic converter 42 and after-fire as well as driving shock or degraded driveability.

Referring again to FIG. 4, there are further provided first and second vehicular speed determining circuits 68 and 69. The first vehicular speed determining circuit 68 is supplied with the vehicular speed output V from the vehicular speed selecting circuit 52 and a reference signal representing a first predetermined vehicular speed value $V_1$ (e.g. 12 km/h). It compares between the two values and generates a first determined vehicular speed signal (FCM$_1$ signal) when $V < V_1$ holds. The second vehicular speed determining circuit 69 operates similarly to the circuit 68 to generate a second determined vehicular speed signal (FCM$_2$ signal) when the vehicular speed V is higher than a second predetermined vehicular speed $V_2$ (e.g. 20 km/h) higher than the first predetermined value $V_1$, both inputted thereto.

Figures 5, 5B:
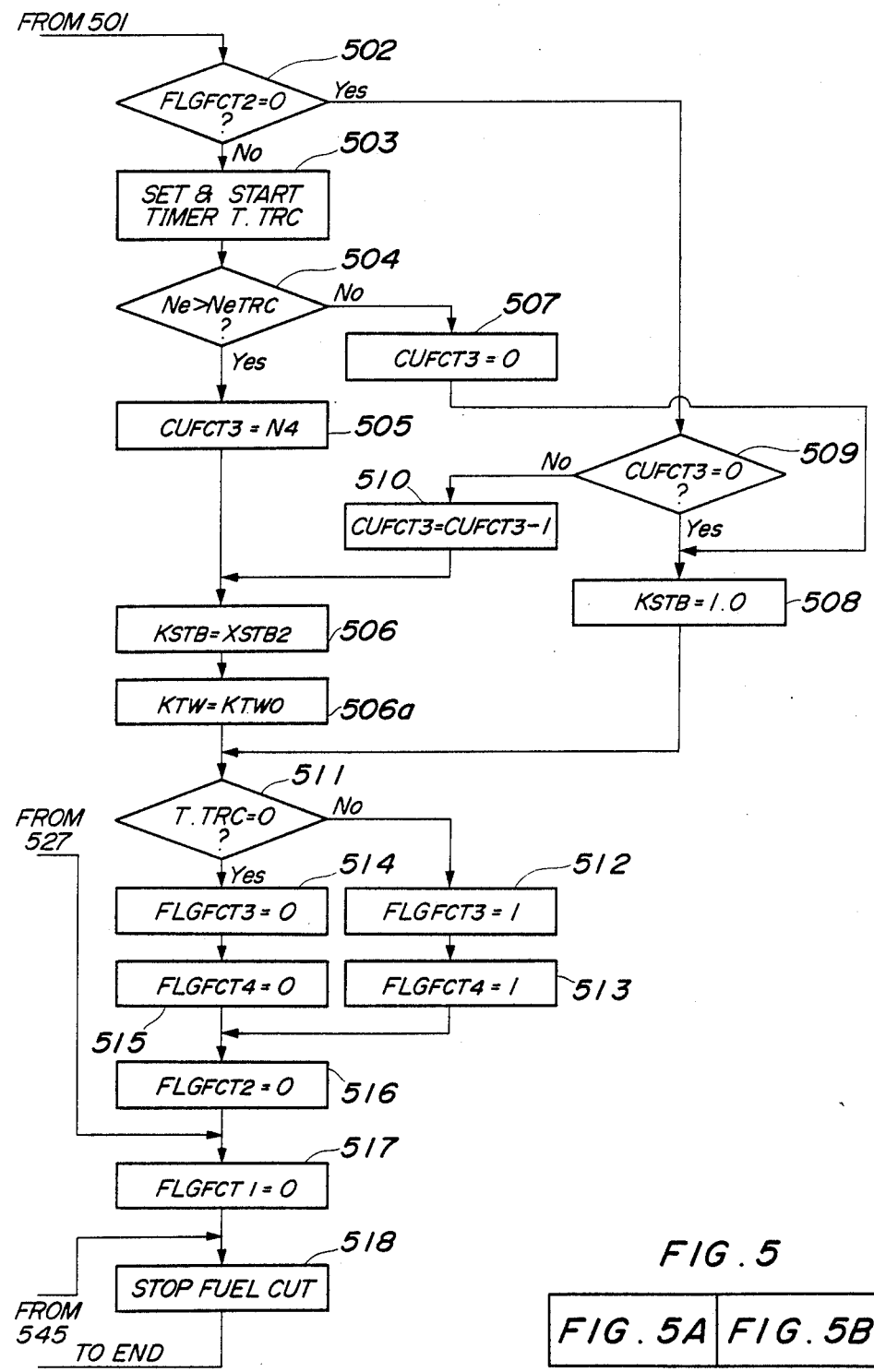
FIGS. 5A and 5B despict a flowchart showing a control program for executing the slip control.
Figure 5A:
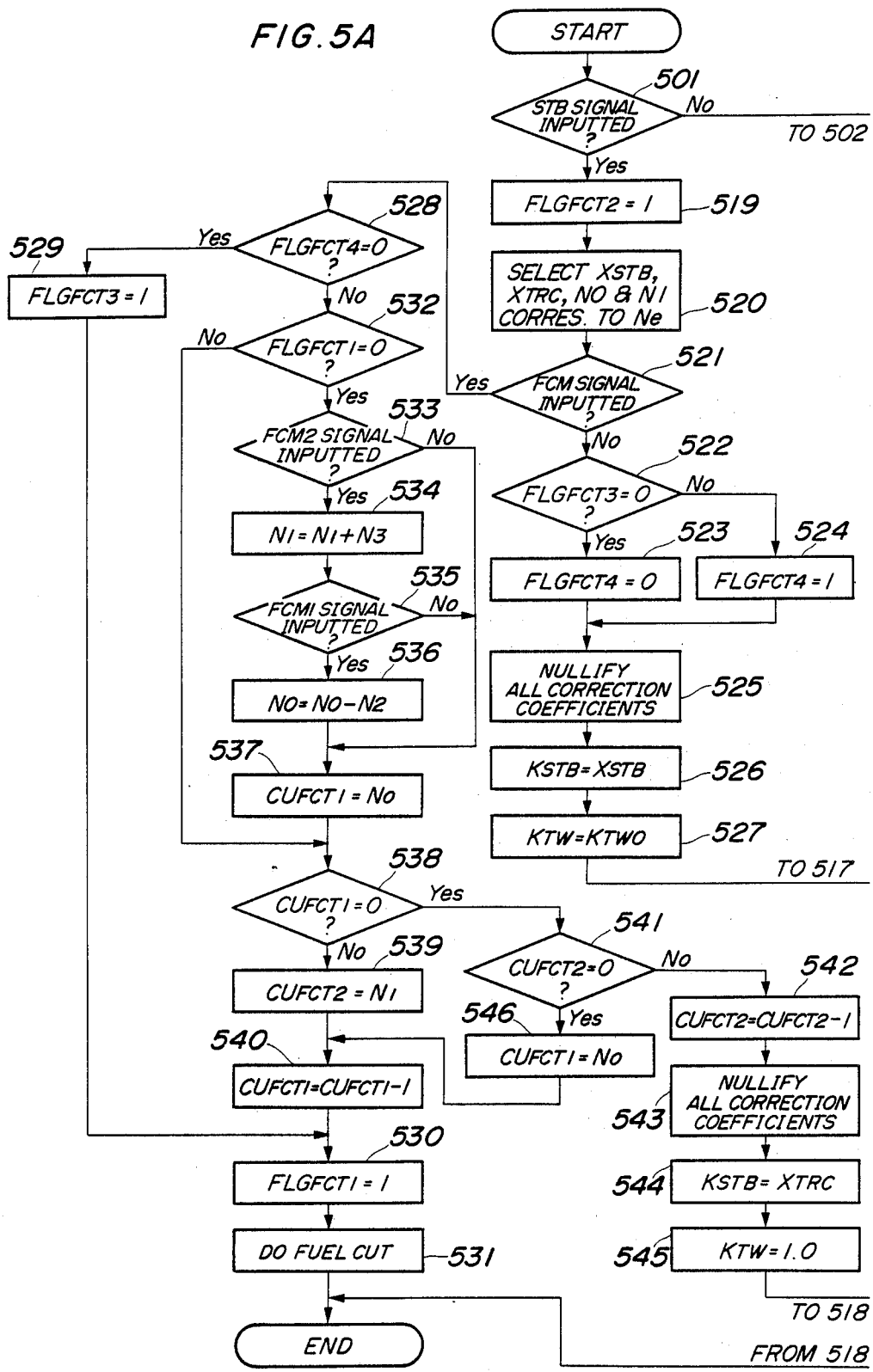

FIGS. 5A and 5B shows a control program for effecting slip control in dependence on the fuel cut signal and the standby signal outputted from the circuit of FIG. 4 and other engine operating parameters. The present program is executed whenever the TDC signal is inputted to the ECU 35.

First, a step 501 calls for a determination as to whether the standby signal has been inputted. If the answer is No, i.e. if no standby signal has been inputted, which means the vehicle 1 is being driven in the off-standby region, the program proceeds to a step 502 wherein it is determined whether a second flag FLG$_{FCT2}$ is equal to 0. This second flag FLG$_{FCT2}$ is set to 1 at a step 519, referred to later, when the standby signal has been inputted, that is, when the vehicle 1 is being driven in either the standby region or the fuel cut region, whereas it is set to 0 at a step 516, referred to later, when the vehicle 1 is being driven in the off-standby region.

If the answer to the question of step 502 is No, that is, if the second flag FLG$_{FCT2}$ is equal to 1, which means the present loop is the first loop immediately after transition to the standby region, the program proceeds to a step 503. In step 503, a timer T.TRC formed e.g. by a down counter is started to count a predetermined time period tTRC (e.g. 2 sec), followed by a step 504 wherein it is determined whether the engine rotational speed Ne is higher than a predetermined value Ne$_{TRC}$ (e.g. 2300 rpm). If Ne > Ne$_{TRC}$ stands, the program proceeds to a step 505 wherein a third control variable CU$_{FCT3}$ is set to a fifth predetermined number N$_4$ (e.g. 2), followed by a step 506 wherein the correction coefficient K$_{STB}$ for slip control is set to a predetermined mixture-leaning value X$_{STB2}$ (e.g. 0.8) which is applied in the off-standby region, as shown at A of (d) (3) of FIG. 6. Then, the engine coolant temperature-dependent fuel increasing coefficient K$_{TW}$ is set to a predetermined value K$_{TWO}$ at a step 506a, followed by the program proceeding to a step 511, hereinafter described.

Figure 8:
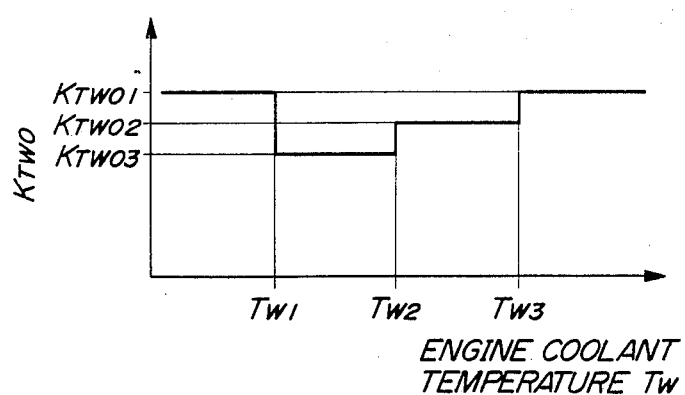
FIG. 8 is a view showing a table of a predetermined value $K_{TWO}$ of an engine coolant temperature-dependent fuel increasing coefficient $K_{TW}$.

The predetermined value K$_{TWO}$ is determined, for example, from a K$_{TWO}$ table, given, by way of example, in FIG. 8, in accordance with the engine coolant temperature TW. According to the FIG. 8 table, the predetermined value K$_{TWO}$ is set in relation to three predetermined engine coolant temperature values TW$_1$–TW$_3$ (e.g. $-10°$ C., $+20°$ C., and $+50°$ C., respectively). Specifically, it is set to a first value K$_{TWO1}$ (e.g. 1.00) when the engine coolant temperature TW is below TW$_1$ or above TW$_3$, and to a second value K$_{TWO2}$ (e.g. 0.90) when TW is TW$_1$ or more and below TW$_2$, and to a third value K$_{TWO3}$ (e.g. 0.95) when TW is TW2 or more and below TW$_3$, respectively.

If the answer to the question of step 504 is No, that is, if Ne ≦ Ne$_{TRC}$ holds, the program proceeds to a step 507 wherein the third control variable CU$_{FCT3}$ is set to 0, followed by setting the slip control correction coefficient K$_{STB}$ to 1.0 at a step 508 (B of (d) (3) of FIG. 6), and then the program proceeds to step 511, referred to above.

If the answer to the question of step 502 is Yes, that is, if the second flag FLG$_{FCT2}$ is 0, indicating that the vehicle was also in the off-standby region in the last loop, the program proceeds to a step 509 wherein it is determined whether the third control variable CU$_{FCT3}$ is 0. If CU$_{FCT3}$ is not 0, CU$_{FCT3}$ is reduced by 1 at a step 510, and then the aforementioned step 506 is executed, followed by step 511 being executed. If $CU_{FCT3}$ is 0, the aforementioned step 508 is executed, followed by execution of step 511.

As will be understood from the above explanation, when the engine rotational speed Ne is high (Ne > $Ne_{TRC}$) immediately after the vehicle has shifted to the off-standby region, the slip control correction coefficient $K_{STB}$ is set to the predetermined value $X_{STB2}$ which is smaller than a normal value of 1.0 over a time period corresponding to a number of TDC signals equal to the fifth predetermined number $N_4$ after transition to the off-standby region, as shown at (d) (1) of FIG. 6. By thus setting correction coefficient $K_{STB}$, a lean mixture is supplied to the engine 31 at an instant immediately after fuel cut is terminated so that the output of engine 31 may be made smaller than a normal value, thereby preventing driving shock which would otherwise be caused by sudden recovery of engine torque at the termination of fuel cut. However, if the engine rotational speed Ne is low (Ne ≤ $Ne_{TRC}$) immediately after fuel cut termination, the above mixture leaning is inhibited in order to prevent engine stall.

Alternatively of leaning the mixture by making smaller the correction coefficient KSTB as above, the ignition timing of the engine 31 may be retarded with substantially the same results as mentioned above, because the ignition timing is retarded, the output of the engine is smaller.

Figure 5C:
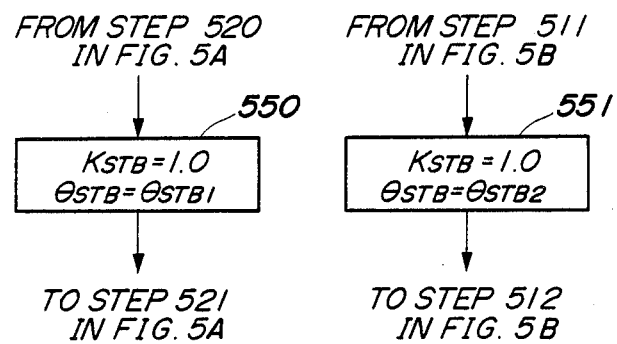
FIG. 5C is a fragmentary flowchart showing a variation of part of the control program of FIGS. 5A and 5B.

FIG. 5C shows an example of a manner of retarding the ignition timing. In FIG. 5C, steps 550 and 551 can be applied in the flowchart of FIGS. 5A and 5B. All the steps in FIGS. 5A and B but the steps 550 and 551 are applicable to the manner of retarding the ignition timing. In the step 550, the correction coefficient $K_{STB}$ is set to 1.0 and a retarding correction value $\theta_{STB}$ is set to a predetermined value $\theta_{STB1}$. The set retarding correction value $\theta_{STB}$ is applied to the following equation to calculate an ignition advance angle $\theta_{ig}$:

$$\theta_{ig} = \theta_{igMAP} + \theta_{STB} + \theta_{CR} \qquad \text{(VIII)}$$

where the ignition advance angle is a crank angle before a reference crank angle position of a cylinder in which ignition is to be effected (e.g. TDC at the end of a compression stroke), $\theta_{igMAP}$ is a basic ignition timing value, which is determined from a map stored in the memory means 35c in ECU 35 as a function of engine rotational speed Ne and a parameter representing load on the engine, e.g. absolute pressure in the intake pipe 32. $\theta_{CR}$ is another retarding correction value which is determined as a function of intake air temperature, etc.

The predetermined value $\theta_{STB1}$ has a minus value (e.g. 20°), and therefore the ignition timing value $\theta_{ig}$ is corrected by $\theta_{STB1}$ to a retard side.

Details of the ignition timing control are disclosed, e.g. by U.S. Pat. No. 4,702,211 assigned to the assignee of the present application.

On the other hand, in the step 551 of FIG. 5C, the correction coefficient $K_{STB}$ is set to 1.0, and the retarding correction value $\theta_{STB}$ is set to another predetermined value $\theta_{STB2}$ (=0) to inhibit retardation of the ignition timing.

Referring again to the step 511, a determination is made as to whether the counted value T.TRC of the timer T.TRC set to start at step 503 is equal to 0. If the counted value T.TRC is not equal to 0, that is, the predetermined time period tTRC has not elapsed after the vehicle 1 shifted to the off-standby region, a third flag $FLG_{FCT3}$ and a fourth flag $FLG_{FCT4}$ are set to 1 at respective steps 512 and 513, and then the program proceeds to a step 516, hereinafter referred to. If the answer to the question of step 511 is Yes, that is, if the counted value T.TRC is equal to 0, indicating that the predetermined time period tTRC has elapsed after shifting to the off-standby region, the third and fourth flags $FLG_{FCT3}$ and $FLG_{FCT4}$ are set to 0 at respective steps 514 and 515, and then the program proceeds to the step 516.

In step 516, the second flag $FLG_{FCT2}$ is set to 0, and then the first flag $FLG_{FCT1}$ is set to 0 at a step 517, followed by the program proceeding to a step 518 wherein the value of the correction coefficient $K_{STB}$ set at step 506 or at 508 is applied to Equation III given before to calculate the fuel injection time period $T_{OUT}$, to effect fuel injection based upon the calculated injection time period $T_{OUT}$, followed by termination of the program.

If the answer to the question of step 501 is Yes, that is, if the standby signal has been inputted, indicating that the vehicle is in either the standby region or the fuel cut region, the program proceeds to a step 519 wherein the second flag $FLG_{FCT}$ is set to 1.

Then, at a step 520, predetermined values $X_{STB}$ and $X_{TRC}$ of correction coefficient $K_{STB}$ to be applied in the standby region and the fuel cut region, respectively, and first and second predetermined numbers $N_0$ and $N_1$ have their values selected, respectively, from an $X_{STB}$ table, an $X_{TRC}$ table, an $N_0$ table, and an $N_1$ table, all stored in the memory means 35c of ECU 35, in accordance with engine rotational speed Ne.

Figure 7:
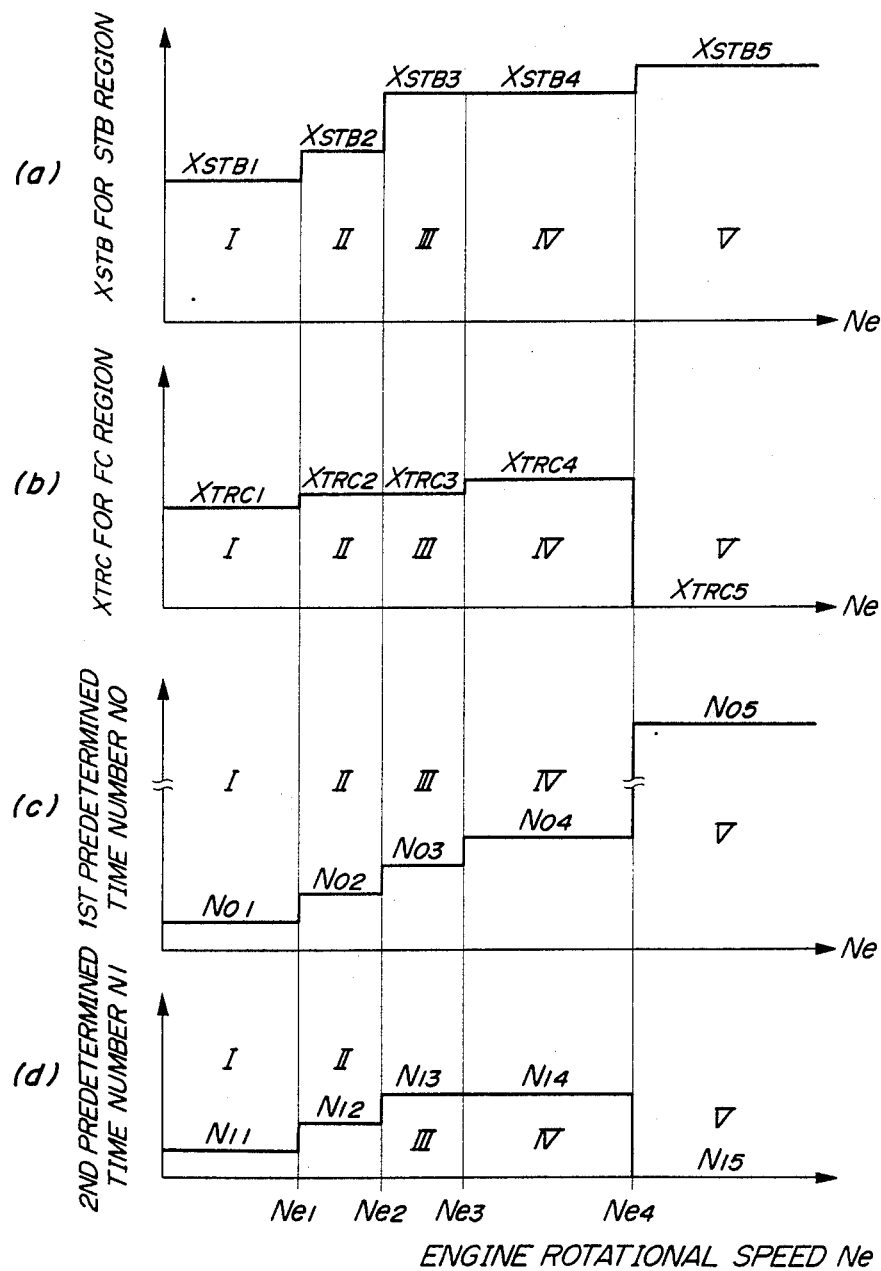
FIG. 7 is a view showing tables of predetermined values $X_{STB}$, $X_{TRC}$, and predetermined time numbers $N_0$, $N_1$ plotted with respect to engine rotational speed $N_e$.

(a)–(d) of FIG. 7 show examples of these tables. According to FIG. 7, each table is divided into five enging speed regions, for each of which is provided a predetermined value of each of $X_{STB}$, $X_{TRC}$, $N_0$, and $N_1$. More specifically, four predetermined values $Ne_1$, $Ne_2$, $Ne_3$, and $Ne_4$ of engine rotational speed Ne (e.g. 2,300 rpm, 2,800 rpm, 3,300 rpm, and 4,800 rpm, respectively) are provided and define the respective engine speed regions, i.e. a region I corresponding to less than $Ne_1$, a region II to $Ne_1$–$Ne_2$, a region III to $Ne_2$–$Ne_3$, a region IV to $Ne_3$–$Ne_4$, and a region V to $Ne_4$ and more, respectively. As predetermined value $X_{STB}$ to be applied in standby region, there are provided values $X_{STB1}$, $X_{STB2}$, $X_{STB3}$, $X_{STB4}$, and $X_{STB5}$ (e.g. 0.50, 0.60, 0.80, 0.80, and 1.70, respectively), to be applied in respective regions I-V. Similarly, as predetermined values $X_{TRC}$ to be applied in fuel cut region, and first and second predetermined numbers $N_0$ and $N_1$, there are provided $X_{TRC1}$–$X_{TRC5}$ (e.g. 0.35, 0.40, 0.40, 0.45, and 0, respectively) as $X_{TRC}$, $N_{01}$–$N_{05}$ (e.g. 1, 2, 3, 4, and 255, respectively) as $N_0$, and $N_{11}$–$N_{15}$ (e.g. 1, 2, 3, 3, and 0, respectively) as $N_1$.

These tables may be designed in various forms, depending upon the characteristics of the engine, the kind of the three-way catalytic converter 42, etc.

Then, the program proceeds to a step 521 wherein it is determined whether the fuel cut (FCM) signal has been inputted. If the answer is No, that is, if the fuel cut signal has not been inputted, indicating that the vehicle 1 is being driven in the standby region, it is then determined at a step 522 whether the third flag $FLG_{FCT3}$ is equal to 0. If the flag $FLG_{FCT3}$ is equal to 0, the fourth flag $FLG_{FCT4}$ is set to 0 at a step 523, while if the third flag $FLG_{FCT3}$ is 1, the fourth flag $FLG_{FCT4}$ is set to 1 at a step 524, followed by the program proceeding to a step 525.

In the step 525, all the correction coefficients but atmospheric pressure-dependent correction coefficient $K_{PA}$, as well as all the correction variables, which are applied to Equation III given above, are set to 1.0 and 0, respectively. That is, all these correction coefficients and correction variables are rendered virtually ineffective. As a result, it is avoided that any changes in the values of these correction coefficients and correction variables affect the fuel injection time period $T_{OUT}$, which makes it possible to control the air-fuel ratio of the mixture supplied to the engien 31 to an optimal value during standby region, in cooperation with setting of correction coefficients $K_{STB}$ and $K_{TW}$ to $X_{STB}$ and $K_{TWO}$, respectively, at stpes 526 and 527, hereinafter described. By thus controlling the air-fuel ratio to an optimal value, emission of unburnt fuel can be reduced in the standby region, thereby preventing after-fire and degradation of the performance of the three-way catalytic converter 42 caused by temperature rise thereof. As stated above, the atmospheric pressure-dependent correction coefficient $K_{PA}$ is not set to 1.0 at step 525, because also in the standby region, the air-fuel ratio can vary depending upon a change in the atmospheric pressure and therefore has to be corrected by means of the correction coefficient $K_{PA}$ even in the standby region.

After setting all the correction coefficients and correction variables to virtually ineffective values at step 525, the program proceeds to step 426 wherein the slip control correction coefficient $K_{STB}$ is set to a value of predetermined value $X_{STB}$ which has been set in step 520 for standby region (at C of (d) (3) of FIG. 6). The ground for this setting of $K_{STB}$ is as follows: During transition between the off-standby region which is an ordinary fuel-supplied region and the fuel cut region wherein fuel supply is interrupted, the air-fuel ratio can largely vary, which can cause unstable combustion of the engine 31 and hence emission of unburnt fuel in large quantities in a low engine speed region in particular, resulting in excessive temperature rise of the three-way catalytic converter 42 and/or in after-fire. Further, the fuel quantity required by the engine 31 varies depending upon engine rotational speed Ne. Still further, in a low engine speed region, the suspension system of the vehicle can be subject to resonance, degrading the driveability. In order to prevent these unfavorable phenomena in the standby region, according to the invention, the slip control correction coefficient $K_{STB}$ is set to predetermined value $X_{STB}$ dependent upon engine rotational speed Ne, whereby excessive temperature rise of three-way catalytic converter and after-fire are prevented and the driveability is improved, over the entire engine speed range.

It will be noted that in a high engine speed region (region V in FIG. 7) the predetermined value $X_{STB}$ is set to a value (1.7) more than 1.0 in the standby region to enrich the mixture. This is because the mixture enrichment increases the amount of unburnt fuel whose evaporation heat promotes cooling of the three-way catalytic converter 42, thus preventing excessive temperature rise thereof. Conversely, the predetermined value $X_{STB}$ may alternatively be set to a value less than 1.0 in a high engine speed region in the standby region, so as to lean the mixture, depending upon the kind of three-way catalytic converter and/or characteristics of the engine.

The program then proceeds from step 526 to a step 527, wherein the engine coolant temperature-dependent fuel increasing coefficient $K_{TW}$ which has been set to 1.0 at step 525 is set to the aforementioned predetermined value $K_{TWO}$. By thus setting $K_{TW}$, the mixture supplied to the engine 31 will be leaned in the standby region, which cooperates with the setting of all the correction coefficient and correction variables to virtually ineffective values at step 525 to prevent after-fire as well as degraded performance of the three-way catalytic converter caused by excessive temperature rise thereof, even at lower temperatures of the engine 31.

Following the step 527, the aforementioned steps 517 and 518 are executed to effect fuel injection by applying the slip control correction coefficient $K_{STB}$ and engine coolant temperature-dependent fuel increasing coefficient $K_{TW}$ set at steps 526 and 527, respectively, followed by ending of the program.

If the answer to the question of step 521, that is, if the fuel cut signal has been inputted, indicating that the vehicle 1 is being driven in the fuel cut region, the program proceeds to a step 528 wherein it is determined whether the fourth flag $FLG_{FCT4}$ is equal to 0. If the fourth flag $FLG_{FCT4}$ is equal to 0, the third flag $FLG_{FCT3}$ is set to 1 at a step 529, and the first flag $FLG_{FCT1}$ is set to 1 at a step 530. Then, fuel cut is effected at a step 531 (at D of (d) (3) of FIG. 6), followed by ending of the program.

As stated before, the fourth flag $FLG_{FCT4}$ is set to 0 when the counted value T.TRC of the timer T.TRC is equal to 0, as is clear from the aforesaid steps 511 and 515, etc. Therefore, when the vehicle has shifted to the fuel cut region after staying in the off-standby region for the predetermined time period tTRC or more, the answer to the question of the step 528 should be Yes, and then fuel cut is to be effected in a continuous manner, as hereinafter described. That is, in the case where the vehicle has shifted to the fuel cut region after a long time of stay in the off-standby region, it can be presumed that the vehicle is being accelerated from a state wherein the slip rate assumes a very small value, e.g. 0 or nearly 0 so that it can be predicted that the variation amplitude and variation speed of the slip rate λ will become greater unless no control is made of the fuel supply. Therefore, in such a case, fuel cut is continuoulsy effected to positively reduce the driving force or torque of the engine 31 so as to promptly bring the slip rate λ to a desired value.

A different continuous fuel cut-effecting condition from the above described one may alternatively be provided. For example, such condition is that the throttle valve 33' has been opened from a fully closed state, or the variation rate of throttle valve opening $\theta_{TH}$ has exceeded a predetermined value, and at the same time the driving wheel(s) 11 and/or 12 are/is in an excessive slip state. When this alternative condition holds, fuel cut may be effected in a continuous manner over a certain period of time, providing subtantially the same results as mentioned above.

If the answer to the question of step 528 is No, that is, if the fourth flag $FLG_{FCT4}$ is equal to 1, the program then proceeds to a step 532 wherein it is determined whether the first flag $FLG_{FCT1}$ is equal to 0. As is clear from the aforementioned steps 517 and 530, this first flag is set to 1 during fuel cut in the fuel cut region, and set to 0 in the other regions.

If the answer to the question of step 532 is Yes, that is, if the first flag $FLG_{FCT1}$ is equal to 0, indicating that the present loop is the first loop immediately after transition to the fuel cut region, it is determined at a step 533 whether $FCM_2$ signal has been inputted, that is, whether the vehicular speed V is lower than the second predetermined value $V_2$. If $FCM_2$ signal has been inputted, that is, $V<V_2$ holds, the program proceeds to a step 534 wherein the second predetermined number $N_1$ selected at step 520 is increased by a fourth predetermined number $N_3$ (e.g. 1), followed by execution of a step 535.

In the step 535, a determination is made as to whether $FCM_1$ signal has been inputted, that is, whether the vehicular speed V is lower than the first predetermined value $V_1$. If $FCM_1$ signal has been inputted, that is, if $V<V_1$ holds, the program proceeds to a step 536 wherein the first predetermined number $N_0$ selected at step 520 is decreased by a third predetermined number $N_2$ (e.g. 1), followed by the program further proceeding to a step 537.

If the answer to the question of step 535 is No, that is, if $FCM_1$ signal has not been inputted, indicating that $V \geq V_1$ holds, or if the answer to the question of step 533 is No, that is, if $FCM_2$ signal has not been inputted so that $V \geq V_2$ stands, the program skips over the aforementioned step 536 to a step 537. As noted above, if $V<V_2$ holds, correction of the first and second predetermined numbers $N_0$ and $N_1$ is effected by deducting $N_2$ from the former and adding $N_3$ to the latter, and if $V_2 \leq V$ holds, correction of the second predetermined number $N_1$ alone is effected by adding $N_3$ to same, while no correction of $N_0$ and $N_1$ is effected if $V \geq V_1$ holds.

In the step 537, a first control variable $CU_{FCT1}$ is set to the first predetermined number $N_0$ which has been selected at step 520 or corrected at step 536, followed by executing a step 538.

If the answer to the question of step 532 is No, that is, if the first flag $FLG_{FCT1}$ is equal to 1, indicating that the present loop is any loop following the first loop immediately after the vehicle has shifted to the fuel cut region, the program jumps to the step 538. That is, the above described steps 532-537 are executed only one time immediately after transition to the fuel cut region.

The step 538 calls for a determination as to whether the first control variable $CU_{FCT1}$ is equal to 0. If the control variable $CU_{FCT1}$ is not equal to 0, the program proceeds to a step 539 wherein a second control variable $CU_{FCT2}$ is set to the second predetermined number $N_1$ which has been selected at step 520 or corrected at step 534. Thereafter, 1 is deducted from the first control variable $CU_{FCT1}$ set as above, followed by execution of the steps 530 and 531 to effect fuel cut [at $E_1$ of (d)(3) of FIG. 6], followed by the program being ended.

If the answer to the question of step 538 is Yes, that is, if the first control variable $CU_{FCT1}$ is equal to 0, it is determined at a step 541 whether the second control variable $CU_{FCT2}$ is equal to 0. If $CU_{FCT2}$ is not equal to 0, the program proceeds to a step 542 wherein 1 is deducted from the second control variable $CU_{FCT2}$. Then, the program proceeds to a step 543 wherein all the correction coefficients but atmospheric pressure-dependent correction coefficient $K_{PA}$ and all the correction variables are set to virtually ineffective values just in the same manner as the aforesaid step 525. Then, the slip control correction coefficient $K_{STB}$ is set to the predetermined value $X_{TRC}$ to be applied in the fuel cut region, selected at step 520 [at $E_2$ of (d)(3) of FIG. 6]. Then, the engine coolant temperature-dependent coefficient $K_{TW}$ is set to 1.0 at a step 545, followed by execution of the step 518 to effect fuel injection by applying these set correction coefficients and correction variables to Equation III, and by ending the program.

If the answer to the question of step 541 is Yes, that is, if the second control variable $CU_{FCT2}$ is equal to 0, the program proceeds to a step 546 wherein the first control variable $CU_{FCT1}$ is set to the first predetermined number $N_0$, as was done in the step 537. This is followed by the steps 540, 530, and 531 to effect fuel cut, and by ending of the program.

It will be learned from the above explanation that even when the vehicle is being driven in the fuel cut region, fuel cut is not effected in a continuous manner if the fourth flag $FLG_{FCT4}$ is equal to 1, but fuel cut over a number of TDC signal pulses equal to the first predetermined number $N_0$ and interruption of fuel cut over a number of TDC signal pulses equal to the second predetermined number $N_1$ are repeatedly alternately effected [at E of (d)(3) of FIG. 6]. The first flag $FLG_{FCT4}$ is set to 1 when the vehicle stayed in the off-standby region for a time period shorter than the predetermined time period tTRC before shifting to the fuel cut region, as is clear from the steps 511 and 513, etc., or when the vehicle has returned to the fuel cut region from the standby region after shifting to the standby region from the fuel cut region without shifting to the off-standby region, as is clear from the steps 529, 522 and 524, etc. In other words, the first flag $FLG_{FCT4}$ is set to 1 when the slip control mode is changed at relatively short time intervals such that the slip rate λ has small variation amplitude and small variation rate. Therefore, on such occasions, it is preferable to effect slip control by alternating effected fuel cut and interruption of same over respective appropriate TDC signal pulse numbers, thereby preventing driving shock due to a sudden drop in the torque of the engine 31 which would be caused if fuel cut is effected in a continuous manner, and hence improving the driveability.

Further, the air-fuel ratio of mixture supplied to the engine 31 is controlled to a leaner value than a normal value by means of the predetermined value $X_{TRC}$ set in dependence on engine rotational speed Ne at the step 520, providing substantially the same results as the aforedescribed control of setting the predetermined value $X_{STB}$ of correction coefficient $K_{STB}$ in dependence on engine rotational speed Ne in the standby region, that is, prevention of excessive temperature rise of three-way catalytic converter 42 and after-fire, and improved driveability.

Also, the first predetermined number $N_0$ and second predetermined number $N_1$ which determine the ratio of TDC signal pulse numbers over which fuel cut and interruption of same are effected, respectively, are essentially set in dependence on engine rotational speed Ne, as stated above, thus also providing similar results to the above-mentioned results obtained by setting the predetermined value $X_{STB}$ for standby region and the predetermined value $X_{TRC}$ for fuel cut region.

Although in the foregoing embodiment the first and second predetermined numbers $N_0$ and $N_1$ are set in dependence on engine rotational speed Ne, this is not limitative, but they may be set in dependence on the slip state of the vehicle, e.g. slip rate λ or slip rate variation $\dot{\lambda}$. Specifically, the first and second predetermined numbers $N_0$ and $N_1$ should be set such that the ratio therebetween has an appropriate value to the slip rate λ or the slip rate variation $\dot{\lambda}$, by taking into consideration the fact that as the slip rate λ or the slit rate variation $\dot{\lambda}$ is greater, the torque of the engine 31 should be reduced by a greater amount or at a greater rate. This alternative setting of $N_0$ and $N_1$ may make it possible to achieve appropriate air-fuel ratio control in a manner more directly responsive to the actual slip rate of the vehicle so that the driving force or torque of the engine can be suitably reduced to promptly bring the slip rate $\lambda$ or the slip rate variation $\dot{\lambda}$ to a desired value.

Furthermore, instead of setting the predetermined values $X_{STB}$ and $X_{TRC}$, and the predetermined numbers $N_0$ and $N_1$ in dependence on engine rotational speed Ne as in the embodiment described above, these values may be set in dependence on other operating parameters of the engine such as load on the engine, e.g. absolute pressure $P_{BA}$ in the intake pipe or the opening $\theta_{TH}$ of the throttle valve, in addition to or in lieu of Ne. By so setting $N_0$ and $N_1$ based upon load on the engine, the ratio between fuel cut period and fuel cut-interruption period can conform to engine load represented by the above parameter $P_{BA}$ or $\theta_{TH}$. This alternative setting is advantageous in overcoming the problem with the prior art that since the amount of drop in the driving force or torque of the engine 31 is different depending upon the magnitude of load on the engine, if the above predetermined values and/or predetermined numbers are so set that the target air-fuel ratio is appropriate to a high load operating condition of the engine, the slip control will be effected to an excessive extent when the engine is operating in a low load operating condition, whereas if they are so set that the target air-fuel ratio is appropriate to a low load operating condition of the engine, the slip control will be effected to an insufficient extent when the engine is operating in a high load operating condition. Therefore, by setting the values $X_{STB}$, $X_{TRC}$, and $N_0$ and $N_1$ based upon engine load, it will be possible to achieve proper air-fuel ratio control and hence proper slip control throughout the entire engine load region, thereby securing satisfactory driveability. If the predetermined values and/or predetermined numbers are set based upon both engine rotational speed Ne and intake pipe absolute pressure $P_{BA}$, they may be set by means of maps with Ne and $P_{BA}$ as setting factors.

Figure 9:
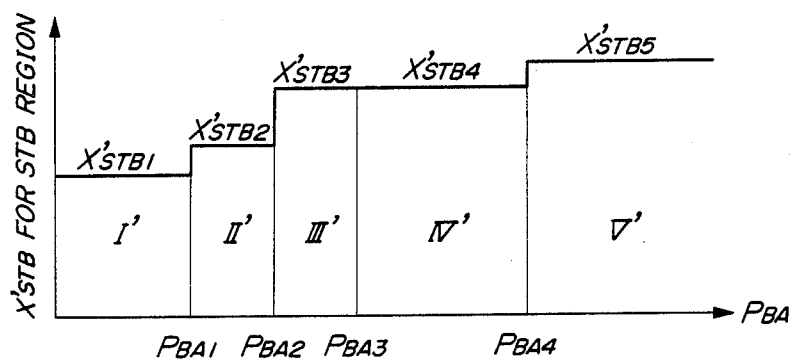
FIG. 9 is a view showing a table of a predetermined value $X'_{STB}$ plotted with respect to intake pipe absolute pressure $P_{BA}$.
Figure 10:
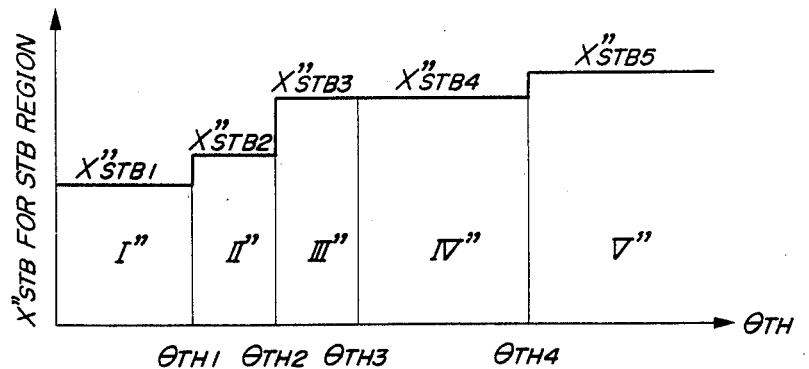
FIG. 10 is a view showing a table of a predetermined value $X'_{TRC}$ plotted with respect to intake pipe absolute pressure $P_{BA}$.

FIGS. 9 and 10 show an example of tables for setting predetermined value $X'_{STB}$ of correction coefficient $K_{STB}$ applied in the standby region, in dependence on engine load. In the table of FIG. 9, the intake pipe absoulute pressure $P_{BA}$ is used as engine load, and in the FIG. 10 table, the opening $\theta_{TH}$ of throttle valve 33' is used as engine load. In FIG. 9, as absolute pressure PBA there are provided predetermined values $P_{BA1}$, $P_{BA2}$, $P_{BA3}$, and $P_{BA4}$ (e.g. 200 mmHg, 350 mmHg, 450 mmHg, and 600 mmHg, respectively), which define $P_{BA}$ regions I', II', III', IV', and V', for respective ones of which there are provided predetermined values $X'_{STB1}$, $X'_{STB2}$, $X'_{STB2}$, $X'_{STB3}$, $X'_{STB4}$, and $X'_{STB5}$ (e.g. 0.50, 0.60, 0.80, 0.80, and 1.70, respectively, as predetermined value $X'_{STB}$. On the other hand, in FIG. 10, as $\theta_{TH}$, there are provided predetermined values $\theta_{TH1}$, $\theta_{TH2}$, $\theta_{TH3}$, $\theta_{TH4}$ (e.g. 70°, 55°, 40°, and 20°), for respective ones of which there are provided predetermined values $X''_{STB1}$, $X''_{STB2}$, $X''_{STB3}$, $X''_{STB4}$, and $X''_{STB5}$ (e.g. 0.50, 0.60, 0.80, 0.80, and 1.70, respectively), as predetermined value $X''_{STB}$.

The predetermined value $X'_{STBi}$ (i=1, 2, 3, 4 or 5) or $X''_{STBi}$ (i=1, 2, 3, 4, or 5) is selected from the table of FIG. 9 or FIG. 10, and applied to the step 526 to set the correction coefficient $K_{STB}$ to $X'_{STBi}$ or $X''_{STBi}$, in place of $X_{STB}$.

Still further, the alternate fuel cut and fuel cut interruption may be effected in various manners, besides the manner described above. For example, the first and second predetermined numbers $N_0$ and $N_1$ may be set in dependence on the speed of the trailing wheels. Moreover, the ratio between fuel cut period and fuel cut-interruption period may be a fixed value, instead of using TDC signal pulses. This can simplify the control system.

What is claimed is:

1. In a system for controlling the slip of driving wheels of a vehicle equipped with an engine, including
    fuel supply means for supplying fuel to said engine,
    first slip detecting means for detecting an excessive slip state of at least one of said driving wheels of said vehicle wherein the slip of said at least one driving wheel has a magnitude greater than a predetermined magnitude, and
    fuel supply interrupting means associated with said fuel supply means and said first slip detecting means, for causing said fuel supply means to interrupt fuel supply to said engine when said excessive slip state is detected by said first slip detecting means,
    the improvement comprising:
        second slip detecting means for detecting a predetermined smaller slip state wherein the slip has a magnitude less than said predetermined magnitude;
        parameter sensing means for sensing at least one predetermined operating parameter of said engine; and
        fuel amount correcting means associated with said fuel supply means, said second slip detecting means, and said parameter sensing means, for correcting an amount of fuel supplied from said fuel supply means to said engine, in dependence on a value of said at least one predetermined operating parameter of said engine, which is sensed by said parameter sensing means, when said second slip detecting means detects said predetermined smaller slip state.

2. A system as claimed in claim 1, wherein said at least one predetermined operating parameter is the rotational speed of said engine.

3. A system as claimed in claim 2, wherein said fuel amount correcting means corrects the amount of fuel in a manner such that as the rotational speed of said engine is higher, the air-fuel ratio of a mixture supplied to said engine is smaller.

4. A system as claimed in claim 1, wherein said at least one predetermined operating parameter is load on said engine.

5. A system as claimed in claim 4, wherein said engine has an intake passage, and a throttle valve disposed in said intake passage, said load on said engine being at least one of the opening of said throttle valve and pressure within said intake passage.

6. A system as claimed in any of claims 1-3, wherein said engine has an exhaust passage, and a three-way catalytic converter disposed in said exhaust passage.

7. A system as claimed in claim 1, further comprising:
    correction value setting means responsive to operating conditions of said engine for setting a plurality of different correction values which correct the amount of fuel supplied to said engine, and
    correction value nullifying means associated with said second slip detecting means for rendering virtually ineffective said plurality of different correction values set by said correction value setting means, when said predetermined smaller slip state is detected by said second slip detecting means.

8. A system as claimed in claim 7, wherein said plurality of different correction values include a correction value for increasing the amount of fuel at acceleration of said engine, a correction value for increasing the amount of fuel at high load of said engine, a correction value for increasing the amount of fuel immediately after the start of said engine, a correction value for correcting the amount of fuel at idling of said engine, and a correction value for decreasing the amount of fuel at low load of said engine.

9. A system as claimed in claim 7 or claim 8, wherein when said second slip detecting means detects said predetermined smaller slip state, said fuel amount correcting means sets a correction value dependent upon said at least one predetermined operating parameter of said engine, and applies the set correction value to correction of the amount of fuel supplied to said engine, in place of said plurality of different correction values rendered virtually ineffective by said correction value nullifying means.

10. A system as claimed in claim 9, wherein said at least one predetermined operating parameter includes a temperature of said engine.

11. A system as claimed in claim 1, wherein said first slip detecting means decides that said at least one driving wheel is in said excessive slip state when at least one of a condition that said at least one driving wheel has a slip rate greater than a first predetermined slip rate and a condition that said at least one driving wheel has a slip rate variation greater than a first predetermined slip rate variation.

12. A system as claimed in claim 11, wherein said second slip detecting means decides that said at least one driving wheel is in said predetermined smaller slip state when only one of a condition that said at least one driving wheel has a slip rate greater than a second predetermined slip rate which is smaller than said first predetermined slip rate and a condition that said at least one driving wheel has a slip rate variation greater than a second predetermined slip rate variation which is smaller than said first predetermined slip rate variation.

13. A system as claimed in claim 11, wherein said first slip rate detecting means decides that said at least one driving wheel is in said excessive slip rate when both conditions are fulfilled that said at least one driving wheel has a slip rate greater than said second predetermined slip rate and that said at least one driving wheel has a slip rate variation greater than said second predetermined slip rate variation.

14. A system as claimed in claim 1, further comprising;
ignition timing setting means for determining ignition timing of said engine in response to at least one operating parameter of said engine;
retarding means associated with said second slip detecting means for retarding the ignition timing determined by said ignition timing setting means by a predetermined angle when said predetermined smaller slip state is detected by said second slip detecting means.

15. In a system for controlling the slip of driving wheels of a vehicle equipped with an engine, including fuel supply means for supplying fuel to said engine,
first slip detecting means for detecting an excessive slip state of at least one of said driving wheels of said vehicle wherein the slip of said at least one driving wheel has a magnitude greater than a predetermined magnitude, and
fuel supply interrupting means associated with said fuel supply means and said first slip detecting means, for causing said fuel supply means to interrupt fuel supply to said engine when said excessive slip state is detected,
the improvement comprising:
second slip detecting means for detecting a predetermined smaller slip state wherein the slip has a magnitude less than said predetermined magnitude;
correction value setting means responsive to operating conditions of said engine for setting a plurality of different correction values which correct the amount of fuel supplied to said engine: and
correction value nullifying means associated with said second slip detecting means for rendering virtually ineffective said plurality of different correction values when said second slip detecting means detects said predetermined smaller slip state.

* * * * *